United States Patent
Smith

(10) Patent No.: US 6,585,069 B1
(45) Date of Patent: Jul. 1, 2003

(54) FLUID LEVITATED CASTER INTEGRATING EXTERNAL DEBRIS SCRAPER

(76) Inventor: Jason L. Smith, 2053 Grant Rd. #109, Los Altos, CA (US) 94024

( * ) Notice: Subject to any disclaimer, the term of this patent is extended or adjusted under 35 U.S.C. 154(b) by 17 days.

(21) Appl. No.: 10/042,450

(22) Filed: Jan. 9, 2002

(51) Int. Cl.[7] .................................................. B60V 1/00
(52) U.S. Cl. ..................................... 180/116; 180/125
(58) Field of Search ............................... 180/116, 117, 180/119–130; 414/676

(56) References Cited

U.S. PATENT DOCUMENTS

| | | | |
|---|---|---|---|
| 3,390,736 A | | 7/1968 | Thomas ........................ 180/119 |
| 3,592,285 A | * | 7/1971 | Noble .......................... 180/124 |
| 3,782,791 A | * | 1/1974 | Neumann et al. ........... 384/116 |
| 3,902,769 A | * | 9/1975 | Neumann et al. ............. 384/12 |
| 3,904,255 A | * | 9/1975 | Neumann et al. ............. 384/12 |
| 4,240,773 A | * | 12/1980 | Terry ............................. 410/47 |
| 5,392,492 A | * | 2/1995 | Fassauer ...................... 15/327.3 |
| 5,967,666 A | * | 10/1999 | Johnson ......................... 384/12 |
| 6,318,488 B1 | * | 11/2001 | Smith ........................... 180/119 |

OTHER PUBLICATIONS

Air Barge Co., Webpage—www.airbarge.com, no date.

* cited by examiner

Primary Examiner—Lesley D. Morris
Assistant Examiner—L. Lum
(74) Attorney, Agent, or Firm—Paul Hentzel

(57) ABSTRACT

An assembly "(42)" including a fluid levitated caster and a debris scraper "(31)" device positioned external to a levitation membrane "(11)". Assembly "(42)" levitates heavy loads upon a near frictionless pressurized fluid, and also sweeps aside potentially membrane destructive debris "(25)" from a floor "(27)" in the path of movement. The external debris scraper "(31)" function does not noticeably increase movement friction, and does not require increased power air flow or consumption.

6 Claims, 2 Drawing Sheets

FLUID LEVITATED CASTER INTEGRATING EXTERNAL DEBRIS SCRAPER

BACKGROUND

1. Field of the Invention

This invention applies to the industry concerned with guidance and propulsion of heavy loads from place to place about a floor in an industry where loads levitate upon a pressurized fluid caster during transport. More particularly, this invention integrates a fluid levitated caster with an external debris scraper.

2. Description of Prior Art

In the fluid caster industry of my invention, a load levitates near frictionless upon multiple fluid casters attached beneath the load. It often takes surprisingly low forces to move the levitated load. On flat floors, relatively smaller loads move by an operator pushing or pulling the load by hand. The low force required to move the levitated load is a major advantage for utilizing fluid caster methodology to move heavy loads.

Fluid caster movement upon floors covered with debris such as nails, sand, screws, nuts, metal chips can be problematic. While inflated, the fluid caster levitation membrane is in near physical contact with the floor surface (usually a couple of thousands of an inch above the floor surface). A debris object squeezed between the floor surface and the levitation membrane surface (if large enough) can cause sufficient air leakage out of the membrane to cause enough friction between the membrane floor to halt movement. Additionally, if the debris particle is large and sharp, it can cut through the levitation membrane rendering it useless. For these reasons, operators of fluid levitated casters take came to carefully sweep the floor clean of debris before use. Sometimes debris particles can be overlooked. It is advantageous for the fluid levitated caster to be able to sweep aside floor debris, keeping it away from the levitation membrane. It is an object of my invention to integrate the fluid levitated caster with an external debris scraper.

Numerous inventors have patented various configurations of fluid levitated casters from about the 1960's and on. However, none of these patents mention the inclusion of a scraper ring which sweeps aside potentially caster damaging floor surface debris. U.S. Pat. No. 3390736 by Thomas, Jun. 28, 1966 shows a very representative fluid caster patent. This levitation caster shows a levitation membrane 22 in contact (or near contact) with the floor surface 30. Note there exists controlled air (fluid) leakage flowing between the levitation membrane 22 and the floor surface 30 creating near-frictionless load transport. The same view also shows the fluid caster frame 34 raised or levitated off floor surface 30 by an amount equal to the levitation membrane 22 lift (as caused by automobile inner tube like air inflation). In this patent (as all others in this industry), it is clear that no structure element exists to sweep away any debris from the floor surface 30. It is also clear from this patent, that any debris on the floor surface 30 could end up under the floor contact portion of the levitation membrane 22 as the fluid caster translates or moves laterally. Such floor debris as sharp metal chips can cut through levitation membranes rendering them useless. Larger floor debris such as screws, nuts, and the like can produce a gap between the flexible levitation membrane 22 and floor surface 30 causing lubrication fluid to escape, creating friction between floor surface 30 and levitation membrane 22, therefore halting load movement.

A cited unpatented fluid levitated caster product is marketed which includes an internal debris scraper ring. The product utilizes the scraper ring both as a debris sweeper and as the levitation membrane. The scraper ring sweeps aside debris objects well, but is not very effective as a levitation membrane. For effective and practical levitation, the levitation membrane should be very compliant to conform to floor imperfections such as pits, cracks, flatness undulations etc. Lack of compliance of the levitation membrane results in poor air sealing with the local floor surface. Poor air sealing can lose the advantage of near frictionless movement force. It's use is like moving levitated loads across the floor with "brakes on"! Even more importantly, the poor air sealing between the floor and the scraper ring necessitates larger air flows and consumption in order that the load stay levitated. With identical air supply flow rates and levitated loads, this fluid caster with internal scraper ring as compared to typical fluid casters without a scraper ring requires a near perfect floor to perform similarly. With real life floor conditions and imperfections, fluid casters without scraper ring can move loads with far less friction, and with far less air consumption.

My invention has the advantage over conventional fluid casters in that it includes an external scraper to sweep aside floor debris so it won't cut levitation membrane or cause friction between levitation membrane and floor surface. My invention has the advantage over the above cited fluid caster with internal scraper ring in that it retains the near-frictionless fluid caster advantage, and requires far less air consumption and flow rate.

SUMMARY OF THE INVENTION

My invention integrates a fluid caster with an external scraper ring into a single assembly. This invention results in a unique device that not only efficiently levitates with near-frictionless a heavy load for transporting, but can also sweep aside floor debris such as nails, sand, screws, nuts, metal chips. This added function prevents debris from causing friction between floor surface and levitation membrane or from cutting the levitation membrane. The scraper ring is external to the levitation membrane, thereby being able to sweep away debris before the debris reaches the levitation membrane area The external scraper ring can be slideably attached to the fluid caster subassembly frame so the scraper ring can move vertically in unison with the levitation membrane vertical lift movement. A separation force between the fluid caster subassembly frame and the scraper ring can insure that the scraper ring is always in forced floor contact sweeping away debris. This downward force on scraper ring can be created in many ways including: gravity pull on heavy weight, spring, fluid pressure/air bag, fluid pressure/piston and cylinder, etc.

The scraper ring design can also assume many embodiments including, but not limited to: ring with brush fibers attached, ring with flexible strip attached, ring with replaceable wear surface attached, ring scrape surface shaped in one of many advantageous configurations conforming to particular floor debris conditions, ring material constructed of one of many materials conforming to particular floor/debris conditions, ring with motorized sweeping rotation, and ring made from several ring segments.

Operators of prior art fluid caster transport systems typically inspect and sweep every square inch of the floor surface over which the load is to be moved to insure all debris is removed. Operators using the fluid casters of my invention need not be concerned that typical unremoved debris will cut through the levitation membrane.

My invention is not appreciably larger in physical size, in weight, nor in cost than that of prior art fluid casters alone. Therefore cost advantages can be realized considering minimizing or eliminating operator floor sweeping and floor inspection labor costs.

An unexpected advantage of my invention is that operator oversight of not finding or not cleaning some floor debris does not result in levitation cut failure.

By way of example, my invention is illustrated herein by the accompanying drawing, wherein:

DRAWING FIGURES

DESCRIPTION OF THE PREFERRED EMBODIMENTS

Figure 1:
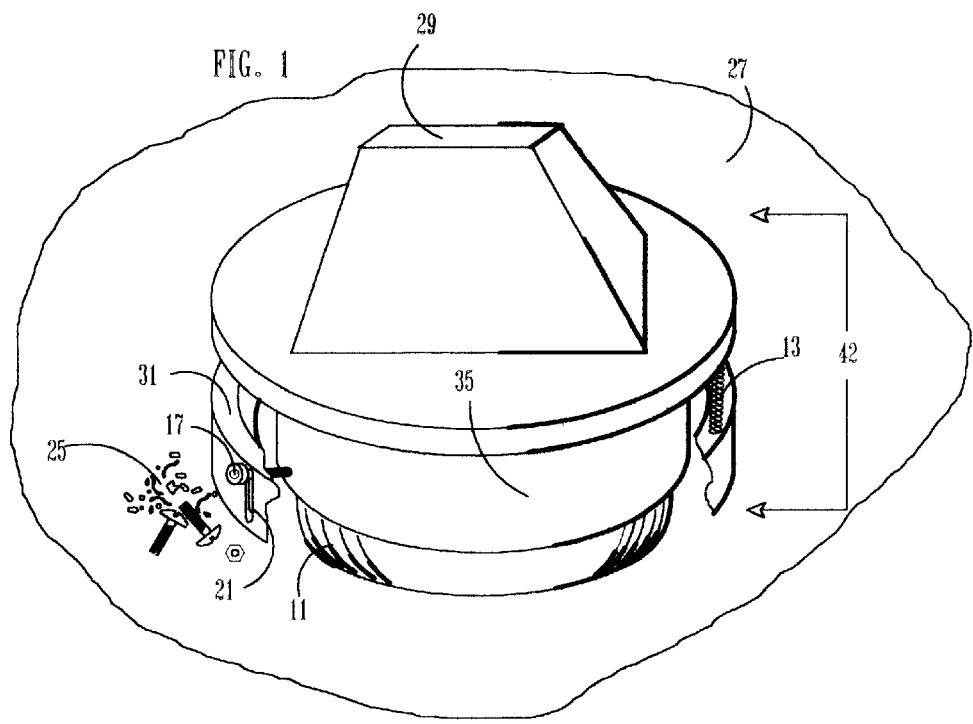
FIG. 1 is a perspective view of a fluid caster integrated with external scraper ring beneath a levitated load shown sweeping debris across a floor.
Figure 2:
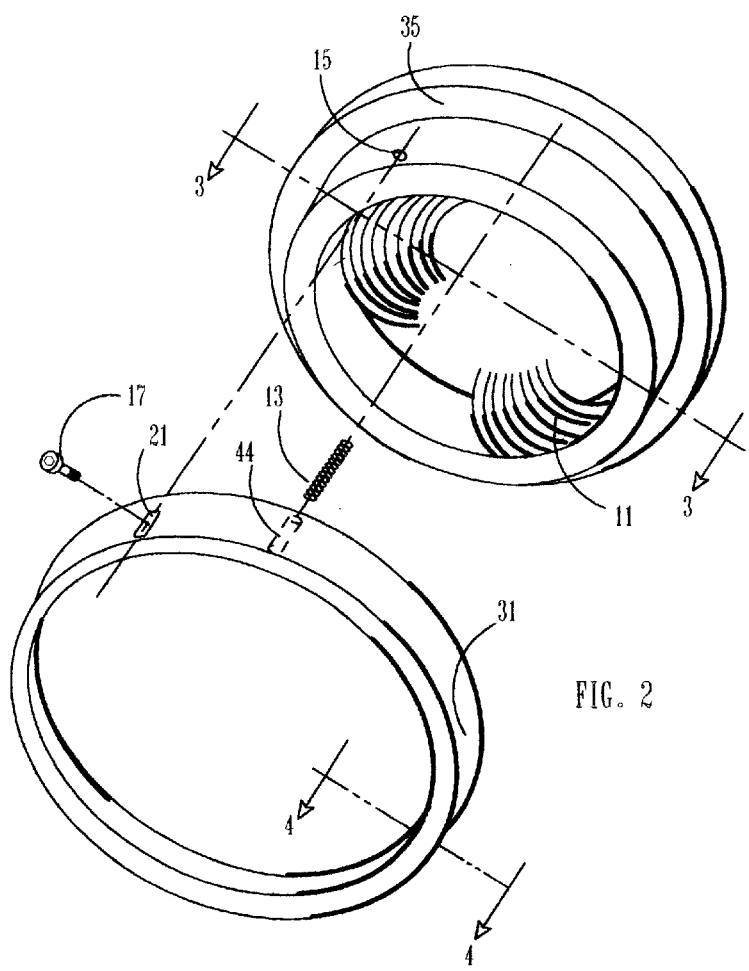
FIG. 2 is a perspective exploded view of fluid caster integrated with external scraper ring showing more detail.

1. The Invention Embodiment in General with Preferred Scraper Ring Configuration The view of FIG. 1 shows my invention "fluid levitated caster integrating external debris scraper" referred to as assembly 42. Assembly 42 is shown positioned beneath a heavy load 29 that is to be moved across a floor 27. Shown on floor 27 is debris 25. Assembly 42 includes a frame 35, a levitation membrane 11, and a scraper ring 31. Frame 35 has on it's periphery a series of tapped holes 15 shown in the view of FIG. 2. Returning to the view of FIG. 1, scraper ring 31 includes through it's wall a series of slots 21, the quantity and position of which matches tapped holes 15. A series of attachment screws 17 position within slots 21 and secure into tapped holes 15. Via this preferred design configuration, scraper ring 31 is free to move vertically within the limits of slot 21 and attachment screw 17 travel. Vertical scraper ring 31 travel is necessary as levitation membrane 11 inflates, deflates, and moves vertically during normal operation. One of a series of spring holes 44 placed into the top surface of scraper ring 31 is shown in the view of FIG. 2. FIG. 1 shows a spring 13 inserted within each spring hole 44. Springs 13 insure that scraper ring 31 is in continual force contact with floor 27 as frame 35 moves vertically with respect to floor 27.

2. Invention Construction Detail

Figure 3:
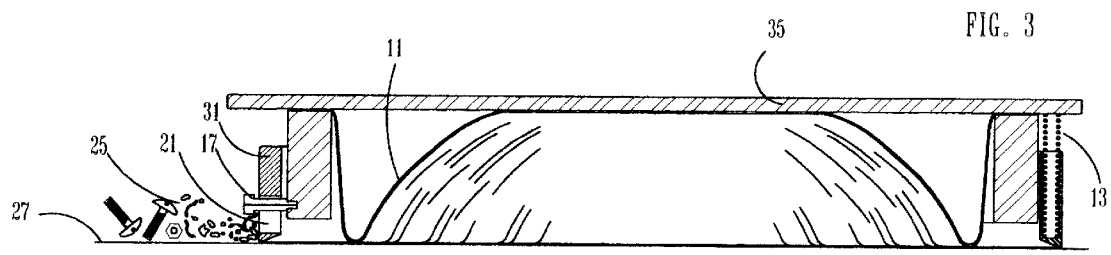
FIG. 3 shows a fragmentary sectional elevation view taken as suggested by lines 3—3 of FIG. 2 shown sweeping debris across a floor.

More details of invention 42 operation and construction show in the view of FIG. 3. As shown in the view of FIG. 3, frame 35 is lifted off floor 27 a distance equal to the inflatable lift of levitation membrane 11. As levitation membrane 11 deflates, frame 35 lowers so that it's bottom most surface eventually touches floor 27. This vertical travel range is slightly exceeded by the range of travel of attachment screws 17 within slots 21. Springs 13 are positioned between frame 35 and scraper ring 31. This combination of scraper ring 31 vertical travel and spring 13 downward force insures that scraper ring is always in contact with floor 27 as assembly 42 is moved laterally during transport. As assembly 42 in general and scraper ring 31 in particular move across floor 27, debris 25 in it's path is swept aside as is portrayed in the view of FIG. 3. Scraper ring 31 inside diameter is slightly larger than frame 35 outside diameter so that there exists a gap between the two components. This gap allows scraper ring 31 to be able to bias slightly or position with a slightly different plane than the plane of frame 35. Such biasing is important for example as scraper ring 31 lifts over a transition sheet metal plate laid on floor 27 while levitation membrane 11 has yet to reach the plate. A reasonable gap magnitude for medium sized assembly 42 is about 1/16 inch. Attachment screw 17 is preferably of the common shoulder screw hardware variety so there is a gap between attachment screw 17 head and the outside surface of scraper ring 31. This attachment screw 17 gap is comparable to the former mentioned gap between frame 35 and scraper ring 31.

Figures 4, 5, 6, 7:
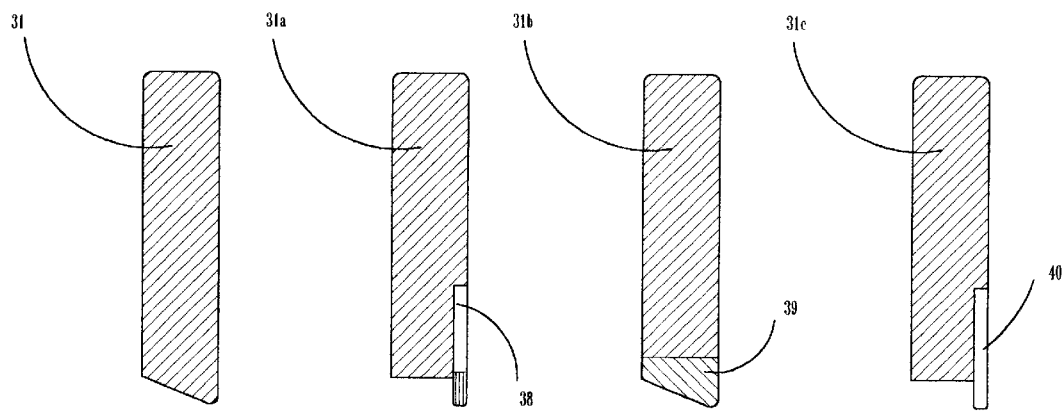
FIG. 4 shows a fragmentary sectional elevation view taken as suggested by lines 4—4 of FIG. 2 with more detail shown of the scraper ring cross section.
FIG. 5 shows a scraper brush alternative embodiment of the scraper ring of FIG. 4.
FIG. 6 shows a replaceable base alternative embodiment of the scraper ring of FIG. 4.
FIG. 7 shows a flexible strip alternative embodiment of the scraper ring of FIG. 4.

One preferred cross sectional shape of scraper ring 31 is shown in the view of FIG. 4. Scraper ring 31 is made of a single piece of homogeneous material including a bottom surface taper and a radiused leading edge. Scraper ring 31 width can be about 3/8 inch minimum to allow for spring hole 44 bore and to retain necessary operating strength. Total spring 13 forces against scraper ring 31 depends on the floor conditions, debris encountered, and size of assembly 42; but 24 pounds of force is a practical value. Scraper ring 31 primary construction material could be any strong rigid material such as aluminum, steel, plastics (including PVC, polypropylene, dense polyethylene, resin fiber) or composites.

3. Alternate Embodiment—Downward Scraper Ring 31 Force

Alternate embodiments of assembly 42 can include other spring 13 configurations such as leaf springs or torsion springs. Even downward force of gravity resultant from a heavy scraper ring 31 design can insure adequate floor 27 contact. Since fluid pressure is readily available at assembly 42, it is practical to include air bags or pistons/cylinders as the forcing elements adding the advantage of zero downward force while installing unpowered assembly 42 on the transport system.

4. Alternate Embodiment—Scraper Ring 31 Configuration

An alternative embodiment can include the design shown in the view of FIG. 5 where a scraper ring 31a includes a scraper brush 38 element capable of sweeping aside smaller sized debris 25 particles.

5. Alternate Embodiment—Scraper Ring 31 Configuration

An alternative embodiment can include the design shown in the view of FIG. 6 where a scraper ring 31b includes a replaceable base 39 element capable of low cost replacement following wear out.

6. Alternate Embodiment—Scraper Ring 31 Configuration

An alternative embodiment can include the design shown in the view of FIG. 7 where a scraper ring 31c includes a flexible strip 40 element capable of sweeping aside more sticky debris 25 particles.

7. Alternate Embodiment—Powered Scraper Ring 31 Configuration

An alternative embodiment (not shown) of assembly 42 can include an added motor powered feature that can rotate scraper ring 31. This configuration can be useful to remove debris 25 that is both plentiful and sticky.

For purposes of exemplification, particular embodiments of the invention have been shown and described to the best understanding thereof. However, other embodiments can include other external scraper ring assembly integrations with a fluid caster, irrespective of particular structure configuration and materials without departing from the spirit and scope of the claimed invention.

I claim:

1. A fluid levitated caster translating device for sweeping aside debris along a movement path surface, comprising:
   (a) a fluid levitated caster means, including a levitation membrane cooperable with said movement path surface to derive fluidic levitating support for said fluid levitated caster,
   (b) a scraper means vertically slideably attached to said fluid levitated caster external to said levitation membrane in cooperation with said movement path surface so as to afford readily debris sweep aside characteristics to the device.

2. An assembly integrating a fluid levitated caster means with a scraper means of claim 1 wherein said scraper means is motorized providing powered debris sweeping assist.

3. An assembly integrating a fluid levitated caster means with a scraper means of claim 1 wherein said scraper means includes a variable-yieldable bias means forcing said scraper against said movement path surface.

4. An assembly integrating a fluid levitated caster means with a scraper means of claim 1 wherein said scraper means includes a brush means contacting said movement path surface.

5. An assembly integrating a fluid levitated caster means with a scraper means of claim 1 wherein said scraper means includes a replaceable segment which contacts said movement path surface.

6. An assembly integrating a fluid levitated caster means with a scraper means of claim 1 wherein said scraper means includes a flexible-compliant segment which contacts said movement path surface.

* * * * *